May 30, 1939.　　　　E. GRANAT　　　　2,160,779
CONCORDANCE RESTORING SYSTEM FOR DISTANT CONTROL MEANS
Filed Nov. 8, 1937　　　6 Sheets-Sheet 1

Fig. 1

E. Granat
Inventor

By Glascock Downing & Seebold
Attys

May 30, 1939.                E. GRANAT                    2,160,779
          CONCORDANCE RESTORING SYSTEM FOR DISTANT CONTROL MEANS
               Filed Nov. 8, 1937              6 Sheets-Sheet 2

May 30, 1939.  E. GRANAT  2,160,779
CONCORDANCE RESTORING SYSTEM FOR DISTANT CONTROL MEANS
Filed Nov. 8, 1937  6 Sheets-Sheet 4

E. Granat
Inventor
By Glascock Downing & Seebold
Attys fig. 5

Patented May 30, 1939

2,160,779

UNITED STATES PATENT OFFICE 2,160,779

CONCORDANCE RESTORING SYSTEM FOR DISTANT CONTROL MEANS

Elie Granat, Paris, France, assignor of one-half to Compagnie des Forges et Acieries de la Marine et d' Homecourt, Paris, France, a company of France Application November 8, 1937, Serial No. 173,524
In France November 20, 1936

8 Claims. (Cl. 172—239)

The present invention relates to distant electric control systems and more particularly to concordance restoring means therefor.

Distant electric control systems have for their object the controlled distant control of any movable part, a piece of ordnance for instance, at the receiving station or stations by control means including a telescope for instance and arranged at a distant control station.

There have already been proposed means for restoring concordance between the control station and the receiver station and for maintaining this concordance during operation. These means comprise synchronous receivers, simple or differential, or else mechanical indicators, which receivers or indicators receive on one hand through electric or mechanical means the position of the control means at the control station and on the other hand, also through electric or mechanical means, the position of the controlled or receiver part. As soon as a lack of concordance becomes apparent between the two positions thus transmitted, the concordance restoring means cause an auxiliary motor to start and to act at the receiver station on a mechanical or electric differential or any other suitable means in order to restore the desired concordance. The device acts in a similar manner during operation so as to constantly maintain the receivers in coincidence with the control or transmitting means.

The present invention has for its object improvements in such concordance restoring means and more specifically in the operation of the main receiver motor driving the part to be controlled, which motor is controlled by the concordance restoring means acting through its rheostat.

To this end according to the invention the motor driving the controlled part is under the sole control of its rheostat which is adjusted by a distributor (or preferably a series of distributors for finer and finer operation) differentially actuated by the distant control part and by means actuated directly by the controlled part, independently of said driving motor, means being provided for returning the rheostat to its inoperative position while the controlled part assumes the position corresponding to the position of the distant control part at the moment considered.

Distributors actuated differentially by the controlled part in unison with the motor driving same and by the distant control part have already been used for differentially correcting the angular position of the said driving motor itself, which driving motor forms at the same time the receiver of a main transmission controlled by the distant control part. Obviously the drawback of this latter system lies in that it requires a double transmission between the distant control part and the controlled part.

In another prior arrangement there is again provided a distributor differentially actuated by the distant control part and by the motor driving the controlled part and this distributor acts on one hand on a make and break system controlling the driving motor and on the other on a progressive speed modifying system. Such an arrangement cannot obviously restore concordance when a shifting occurs between the controlled part and the motor driving same and furthermore the control means for the driving motor are intricate and do not work smoothly as would a rheostat forming the sole control means for the driving motor.

The distributors used in the invention are preferably of the usual multiple stage type including for instance coarse and fine rotary elements.

In the following description, it has been supposed by way of example and by no means limitatively that the receiver is a piece of ordnance or a torpedo-firing tube and the control means at the control station are constituted by a telescope while the principal motor actuating the controlled device at the receiver station is an electric motor. The angles transmitted are furthermore supposed to be horizontal or azimuth angles. Of course, the same arrangement would be applicable in other cases, e. g., when the principal motor acting on the controlled device forms one of the elements of a hydraulic transmission.

In this case of an electric motor, the part controlling the motor is generally the usual rheostat arm, having two directions of operation, acting on the motor either directly or through the agency of a booster or a Ward-Leonard system; in either case, the action of this rheostat arm produces a modification in the desired sense of the speed of the principal or directing motor between zero and maximum speed.

The device according to the present invention is caused to act on the rheostat arm so that the distant control system with the automatic concordance restoring means may be incorporated to an extant system including a hand controlled rheostat with little cost while retaining the major part of the existing parts.

Lastly another feature of the invention consists in that the control of the rheostat arm is performed at variable speed and that the speed obtained depends (at least between certain limits) on the degree of the shifting appearing in the distant control system; this arrangement provides a greater elasticity for the control and furthers the stability of the system around the position of equilibrium; it increases in fact the damping when equilibrium is reached i. e. when concordance between the telescope and the piece of ordnance is obtained.

This variation in speed of the concordance restoring auxiliary motor is obtained through a special constitution of the distributors and contacts controlled by the receivers of the concordance restoring device.

The present invention illustrates in particular a modification in which the concordance restoring means include the usual two or more stages which cause the auxiliary motor to start at different speeds, the last stage allowing moreover as known per se a progressive reduction in speed up to the moment of the breaking of the circuit upon reaching concordance between the controlling and controlled parts.

To this end the first and if required intermediary stage distributors operating at slower speeds for obtaining rough concordance comprise, beyond the usual contacts used in the art, segments corresponding to a portion of the circumference and the angular importance of which corresponds to the fraction of the movement of the controlled part for which the stage considered of the concordance restoring means is to be operative. Consequently the last speed-increased stages, i. e. those the accuracy of which provided through one revolution is the highest, may become operative in succession only when the prior stage ceases being operative; under such conditions, the last stage or eventually, in the case where the number of stages is high, the last stages comprise beyond the two contact rings which cause the starting of the auxiliary motor at a given speed for the stage considered, a series of contact pieces connected with adjusting resistances or potentiometers adapted to produce a modification in the voltage at the terminals of the armature and/or of the field piece of the concordance restoring auxiliary motor.

In the application described hereinafter by way of example, the concordance restoring auxiliary motor acts no longer directly on the controlled part as heretofore but on a rheostat arm having of necessity a limited path on either side.

At the same time the speed adjusting rheostat arm is mechanically connected with a control device adapted to return into their neutral position the contact pieces of the distributors for the purpose explained hereinafter.

According to another modification the auxiliary motor is omitted and the ordnance controlling motor, assumed to be electric, is acted upon directly as the contacts of the concordance restoring means control suitable adjusting resistances in the circuit of said motor.

There is described hereinafter by way of example and with reference to accompanying drawings several forms of execution of devices according to the invention as disclosed hereinabove. These devices are illustrated as provided with two distributors and act by way of example on the direction of ordnance controlled through electric motors; of course the same devices would be applicable in the case where the accuracy desired requires a larger number of distributors and where the controlled is not electrically actuated. For instance if it is hydraulically actuated, the gate controlling means would be actuated by the auxiliary motor for restoring concordance.

Figure 1:
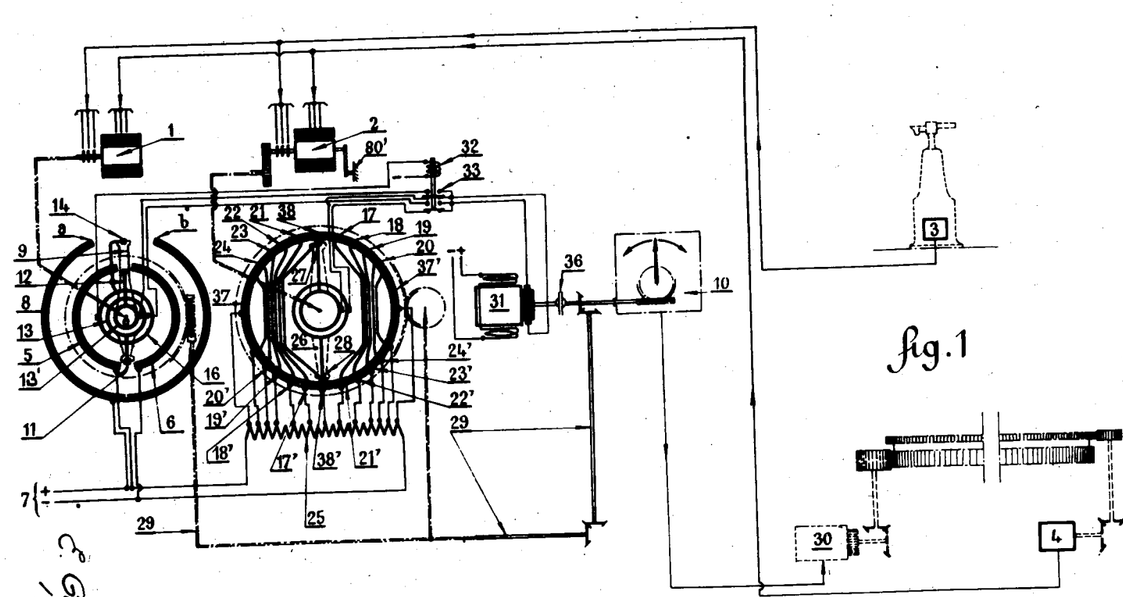
Fig. 1 shows a concordance restoring system providing a variable speed of adjustment.

The concordance restoring system shown in Fig. 1 comprises two differential receivers provided each with two polyphase windings adapted to rotate one with reference to the other; one receiver 1 serves for rough operation and the other 2 for the final or accuracy step. These receivers receive two angular movements; on one hand that of the controlling part (transmitter 3) and on the other hand that of the controlled part (transmitter 4) and rotate through angles corresponding to the difference in the shift produced in their fields through the electric transmission of said angular movements to the windings of said receivers. These receivers control the respective position of brushes and contact bearing plates or distributors so as to modify, as disclosed hereinafter, the position of the controlled part when shifted with reference to the controlling part.

The contact carrying plate or distributor corresponding to the first or rough operating differential receiver 1 carries the two segments 5 and 6 connected with the current supply 7. It carries moreover a segment 8 concentric with the first segments and including over a portion of the circumference an insulating portion not shown in the figure: this insulating portion is determined in accordance with the speed reducing ratio between the distributors controlled by the two receivers 1 and 2 so as to avoid operation of the higher speed or accuracy receiver when the initial shifting between the controlling part and the controlled part is above a given angle.

Over these distributor segments 5, 6 and 8 moves a contact carrying arm 9 which is mechanically connected with the lower speed rough operating differential receiver 1. The arm 9 carries brushes or contacts 11 and 12 rubbing on the segments 5 and 6 so as to reverse the current feeding the rings 13 and 13' in accordance with the relative position of the segments 5, 6 and of the arm 9; the latter also carries a brush or contact 14 moving over the outer segment 8 so as to control the feed of the third ring 16 in accordance with the relative position of the contact 14 with reference to said segment 8.

The distributor of which the action is controlled by the high speed differential receiver 2 comprises a series of contact pieces 17, 18, 19, 20, etc., and 21, 22, 23, 24, etc., connected with different suitably distributed points of the resistance 25 and it further comprises a second series of contact pieces 21', 22', 23', 24', etc., and 17', 18', 19', 20', etc., arranged symmetrically with reference to the former contact pieces and connected with the same points of the stationary resistance 25. Moreover the number of these contact pieces may be chosen as desired and is all the higher when a more continuous adjustment is required. The systems of contact pieces of both distributors are bodily connected through a suitable reducing gear with the rheostat arm 10 through the mechanical connection 29.

The differential receiver 2 controls mechanically through suitable reduction gears the arm 26 carrying two contact brushes diametrically opposed 27 and 28 moving over the just described contact pieces 17 to 24'.

The rheostat arm 10 has two directions of operation and controls the adjusting resistances of the motor 30 controlling the direction of the piece of ordnance not shown. This control of the resistances may be effected in accordance with the power required; either directly or through the agency of a booster.

In both cases the displacement of this arm 10 causes the motor 30 to start in one direction or the other at a speed which varies in accordance with the position of this arm.

The auxiliary concordance restoring motor 31 is fed from the mains 7 with the interposition of the successively acting circuits of the rough operating low speed distributor and more accurate high speed distributor. In the accuracy circuit the adjusting resistances 25 reduce the speed of operation up to the moment when the motor stops as shown in Fig. 1. A relay 32 controls a series of contacts 33 which connect the motor 31 with either of the two distributors; the energizing of the relay 32 is provided through the ring 16 of the rough operating circuit and is provided consequently by the initial shifting of the transmitter before concordance is restored.

The operation of the system is as follows: as soon as the controlling part and the controlled part i. e. the transmitter 3 and the transmitter 4 (which are not directly interconnected) are shifted one with reference to the other, the differential receivers 1 and 2 are correspondingly shifted. If, as is the case of Fig. 1, the firing field of the ordnance is less than 180°, the relative positions of the contact carrying arm 9 with reference to the segments 5, 6 and 8 are such that the rings 13 and 13' are set under tension with a polarity depending on the direction of shifting; on the other hand the relay 32 is energized as soon as the contact piece 14 comes into contact with the segment 8. Consequently, if the shifting between the telescope and the piece of ordnance is greater than half the angle aob, the energized relay 32 causes the auxiliary motor 31 to be fed through the rings 13 and 13' in a direction which corresponds to that of the shifting. The result is a rotation of the rheostat arm 10 in one direction or the other; a friction clutch 36 acting as a stress limiting device may allow the motor to continue its rotation when the arm has reached one of its extreme positions, defined when required by a mechanical stop.

If the shifting between the telescope and the piece of ordnance is less than half the angle aob, the relay 32 is no longer fed through the ring 16 so that the relay assumes the position of Fig. 1 and the auxiliary motor 31 is fed through the brushes 27 and 28 with variable potentials from the resistance 25. This auxiliary motor moves thus at a speed which depends on the initial shifting of the observation means with reference to the piece of ordnance.

The limits of operation of the auxiliary motor 31 through the successive distributors, as well as the reducing ratios between the two stages are predetermined in accordance with circumstances. In the case of the figure, the angle aob defines the boundaries of action of the rough operating distributor; when the contact-piece 14 of the latter returns towards its position of equilibrium and leaves the point a or the point b, the movable arm 26 of the accuracy distributor rubs over the contact pieces 37 and 37'; it has only to pass over a portion of a circumference in order to return into its position of equilibrium, i. e., over the contact pieces 38 and 38'. As soon as it has entered this position, the auxiliary motor 31 stops. The said motor stops all the more rapidly as the contact pieces 38 and 38' form a short circuit for the position of equilibrium.

As disclosed hereinabove, when the rheostat arm 10 is at one of the ends of its path, the auxiliary motor 31 continues rotating as it is fed until concordance is completely restored, the friction clutch 36 having for its object to provide independence between 31 and 10 when the rheostat arm has entered its outermost position. At the same time when the ordnance controlling motor 30 approaches concordance with the distant control part, the speed of said motor 30 should be progressively reduced to zero, starting from the actual value corresponding to this outermost position of the rheostat arm. To this end it is necessary to mechanically correlate the position of the arm 10 of the starting rheostat with the position of the systems of contact pieces of the accuracy distributor on one hand and also as shown but not necessarily with that of the rough-operating distributor on the other; this is performed through the already mentioned suitably speed reducing gearing 29, which controls through the position of the rheostat arm 10 that occupied by the distributor arm 26 (and 9). The telescope 3 being assumed to move at high speed, the arm 10 moves rapidly towards its extreme position but the action of the gearing 29 results in a return motion of the distributor contact arms which in its turn reduces the speed of rotation of 31 and the progress of the arm 10. In the general case of a small angular shifting between the telescope and the piece of ordnance, the shifting of the arm 26 will remain small and if it remains smaller than half the angle aob, the arm 10 will remain under control of the accuracy distributor. In this case, the angular position of the arm 26 will cause the arm 10 to assume a similar position. Thus when a slight shifting is to be compensated, the control motor 30 is started at low speed; for a greater shifting, the displacement of the arm 10 will be greater (though reduced within certain limits by the return gearing 29) and the speed of the motor 30 will be higher. The speed will thus increase gradually in accordance with the initial shifting up to a maximum speed corresponding to a location of the arm 26 over the segments 37 and 37' for which the arm 10 is in its outermost position. For a greater shifting, the accuracy distributor is no longer active as disclosed hereinabove while the rough operating distributor causes the auxiliary motor 31 to rotate at maximum speed. It is the action of the return gearing 29 which now returns the arm 10 to inoperativeness so as to stop the motor 30 in the position of concordance for the controlled part. To this end the shifting provided by said return gearing 29 in the distributors causes a stop in the motor 31 before return of the distributor contacts to normal inoperative position shown in Fig. 1. Thus the motor 31 stops momentarily while motors 4, 1, 2, 30 continue rotating; the distributor plate driven by 30 passing beyond the distributor contacts, the motor 31 starts in a direction opposite to prior rotation which produces reverse rotation of rheostat arms 10 and consequently sets the arms 9 and 26 in pursuit of their distributor plates until said arms and plates are returned to their position corresponding to actual concordance shown in Fig. 1 for which arm 10 and consequently motor 30 are also inoperative. The auxiliary motor 31 which has continued being fed during this reversed rotation for returning arm 10 to inoperativeness, stops also at this moment.

As explained hereinafter with reference to Fig. 4, the clutch 36 may be replaced by arresting means 40 and 41 for the motor 31, controlled by the movement of the said motor, for instance through a screw on the motor-shaft carrying a nut the progress of which produces operation of a pivoting switch adapted to short circuit the rotor of 31. With this arrangement, the latter is stopped as soon as the arm 10 has reached its extreme position, the contacts being then prepared to provide for the restarting of the motor in the reverse direction when the concordance restoring means are again active and the rheostat arm is to return to its neutral position.

It should be noted that by reason of the material arrangement of the accuracy distributor, the maximum rotation of the arm 26 is 180°, i. e., 90° to either side of the position of equilibrium shown in Fig. 1; consequently in the form of execution illustrated the displacement of the arm 26 must be reduced in the ratio 1:2 with reference to that of the receiver 2. For the same reason, this receiver must include a stop 80' which prevents it from making more than one entire revolution.

Figure 7:
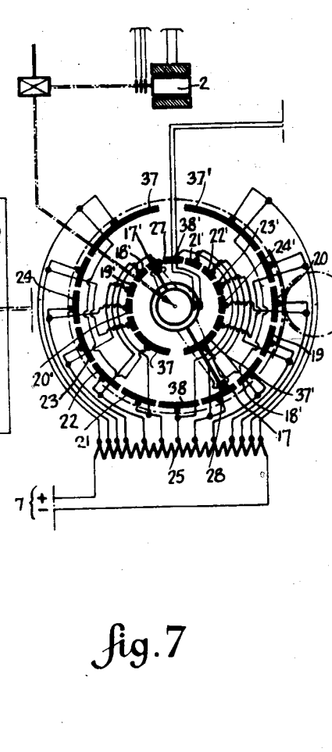
Fig. 7 shows a modification of the distributor.

This particular arrangement may however be avoided and the differential receiver 2 may be allowed to rotate in a continuous manner while the ratio 1 is retained between the movements of the receiver and of the movable arm 26; in this case the adjustment between the point of maximum speed in one direction of the motor 31 and the point of maximum speed in the other direction of this motor is effected over a displacement no longer of 180° but of 300°. This arrangement may be executed as illustrated in Fig. 7. The distributor comprises no longer as in the former case a single series, but two concentric series of contact pieces such as 17, 18, 19, 20, etc., and 21, 22, 23, 24, etc., for one series corresponding to the contact pieces bearing the same reference numbers in Fig. 1 while the other series comprises contact-pieces 17', ... 24' ... corresponding also to those in Fig. 1; similarly, the arm 26 has its brushes 27 and 28 which move respectively over the two series of contact pieces.

The operation of the device is exactly the same as that described previously, but in this case the receiver 2 and the arm 26 may rotate in a continuous manner. In this case and as shown, the inner contacts comprise further contact pieces 37₁ and 37'₁, electrically connected with the corresponding outer contacts 37 and 37'.

In this form of execution the arm 26 moves continuously from neutral position over contact pieces 38—38' on to the successive couples of contact pieces 17—17' ... 37₁, 37' for increasing progressively the speed of motor 31 and back symmetrically through 37'₁—37 ... 21—21' to inoperative 38—38'. The rotation may of course be performed in the opposite direction or only to and fro without complete rotation.

The arrangement disclosed in Fig. 1 requires a mechanical connection between the arm 10 and the auxiliary motor 31. This arrangement may show certain difficulties of execution when the whole of the concordance restoring system is to be carried by a stationary part while the arm 10 alone is carried by the movable part of the ordnance. For this reason the arrangement of Fig. 1 is more particularly applicable when the whole of the concordance restoring means is carried by the ordnance and the mechanical connection between the auxiliary motor 31 and the arm 10, is then easy to execute. In the case where, for reasons of execution or the like, it is not possible to make the ordnance carry the concordance restoring means together with its auxiliary motor, the arrangement illustrated in Fig. 2 may be used. There is then provided a second stationary rheostat, the arm 47 of which is used for automatic operation in lieu of the rheostat arm 10 carried by the piece of ordnance and which is here used solely for hand control; a switch 45 arranged either on the stationary part or on the movable part provides the electric connections required either for hand control through 10 or for automatic control through 47. In the particular construction provided the rheostat controlled by the arm 47 is distinct from that controlled by the arm 10; but in a modification it may be formed in one therewith. Consequently, in the arrangement illustrated the whole assembly constituted by the concordance restoring means, the auxiliary motor 31 and the arm 47 and its rheostat is carried by the stationary part; alone the hand-controlled rheostat arm 10 remains carried by the ordnance or like movable part.

Figure 2:
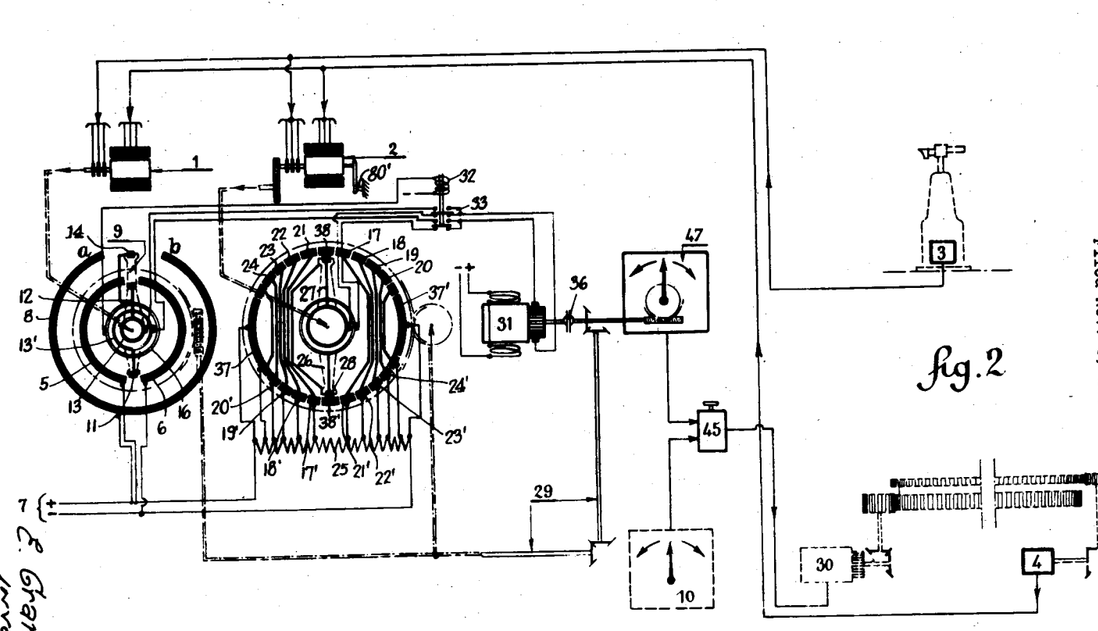
Fig. 2 is a modification of Fig. 1 wherein the ordnance controlling motor may be controlled by hand through a second rheostat arm which is stationary with reference to the ordnance or the like controlled part.
Figure 3:
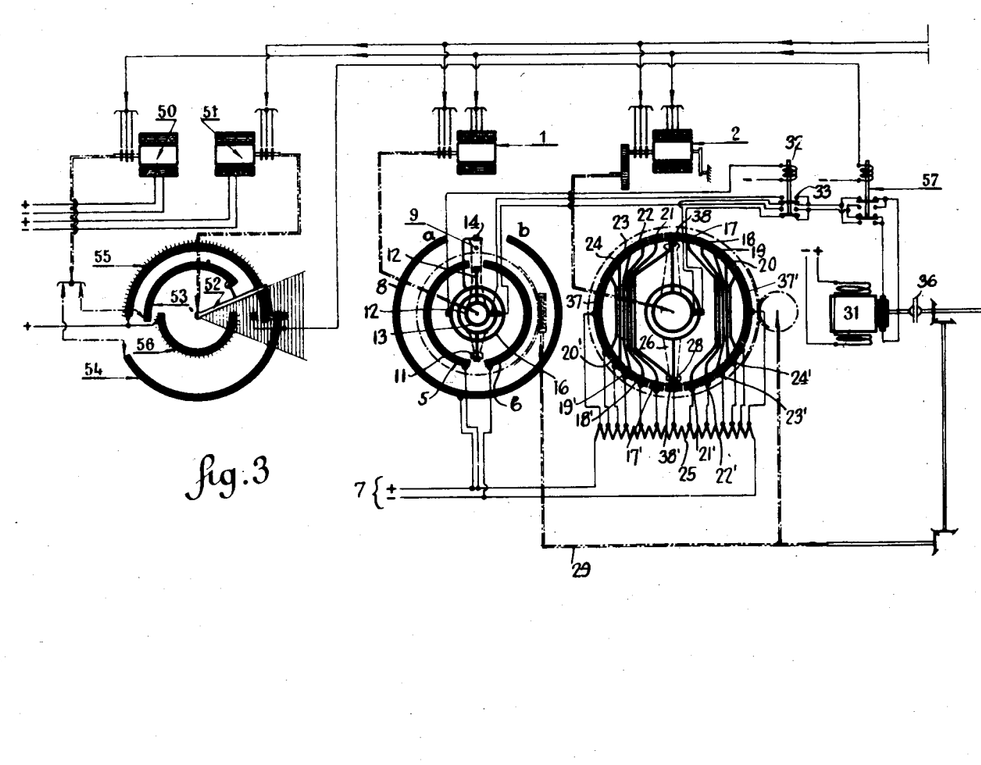
Fig. 3 is a modification of Figs. 1 or 2 wherein the ordnance is capable of effecting an angular rotation above 180° limited by a forbidden zone.

Fig. 3 is a modification of Figs. 1 or 2 for the case where the controlled device is capable of effecting an angle of rotation above 180°. In this case, there is used a motion reversing device arranged as follows:

The distributors and their connections remaining as in Fig. 1, there are used further receivers 51 and 50 which reproduce respectively the positions of the telescope and of the piece of ordnance. The contact carrying arm 52, the contact-pieces on which are angularly spaced as shown in accordance with the extent of the forbidden zone, is controlled through the receiver 51 while the segments 53 and 54 feeding the reversing relay 57 for the motor 31 are controlled by the receiver 50; the stationary semicircular segments 55 and 56 are concentric with the segments 53 and 54 which each extend over opposite half-circles diminished by an angle equal to the forbidden zone.

The operation of this motion reversing device is the following: as long as the restoration of concordance may be performed normally, i. e., through the shortest path, the device is inoperative; if on the contrary by reason on one hand of the existence of a forbidden zone smaller than 180° for the ordnance or the like and on the other hand of the relative spacing through more than 180° of the telescope and ordnance at the moment of initiating operation, the restoration of concordance is impossible through the shortest path, a reversal is performed through the relay 57 and the restoration of concordance is effected through the longest path (i. e., above 180°) outside the forbidden zone so that the piece of ordnance moves without abutting against the stops defining said zone; this is performed, as apparent, through the closing of the circuit of the relay 57 through one of the segments 53—54 in contact with the corresponding stationary contact piece connected with 57 as soon as the telescope enters the forbidden zone, i. e., the arm 52 comes inside the hatched part; as this contact-carrying arm 52 is constantly in contact with one of the segments 55—56 connected with the plus terminal, the contacts on said arm will contact with the segment 53 or 54 in electrical connection with the relay 57 as long as the ordnance and telescope are spaced by more than 180°, i. e., as long as the ordnance is to perform more than 180° outside the forbidden zone to return to concordance. This angle is materialized by that between part 52 and the bisecting line separating the corresponding ends of the segments 53—54. Thus the telescope-following arm 52 in electric connection with the plus terminal will close the circuit over the relay 57 provided that the direction along and opposed to the direction of ordnance (i. e., the just-defined bisecting line) falls outside the hatched part so as to provide contact between 53 or 54 and one of the contacts lying in the axis of the hatched forbidden part and also that the telescope arm 52 is within said hatched part so as to contact with the segments 53 or 54 in the just-defined position which ensures the closing of the circuit. However as soon as the angle separating the telescope from the piece of ordnance becomes equal to 180°, the motion reversing system ceases operation again and the concordance restoring system operates as in the case of Figs. 1 and 2, i. e., through the path which is now the shortest.

It should be noted moreover that the control of the reversing means described hereinabove and that at least of the contact carrying arm 9 of the concordance setting device (rough operating circuit) may be effected simultaneously through the two receiver motors 50 and 51 alone, by arranging between these receivers, a mechanical differential for controlling the arm 9. This is shown in Fig. 4 which is a modification of Fig. 1 wherein the concordance restoring system comprises simple motors instead of differential receivers; this arrangement is applicable in particular when it is possible to make use directly of the motion of one of the two parts, telescope or more generally piece of ordnance; in this case, the part transmitting the angular position of one of these two parts may be omitted and replaced by a mechanical connection. The receivers are then simple and the differential motion is obtained by means of a mechanical differential; the whole of the remainder of the system, distributors, contact pieces, concordance restoring motor, remains unchanged.

Figure 4:
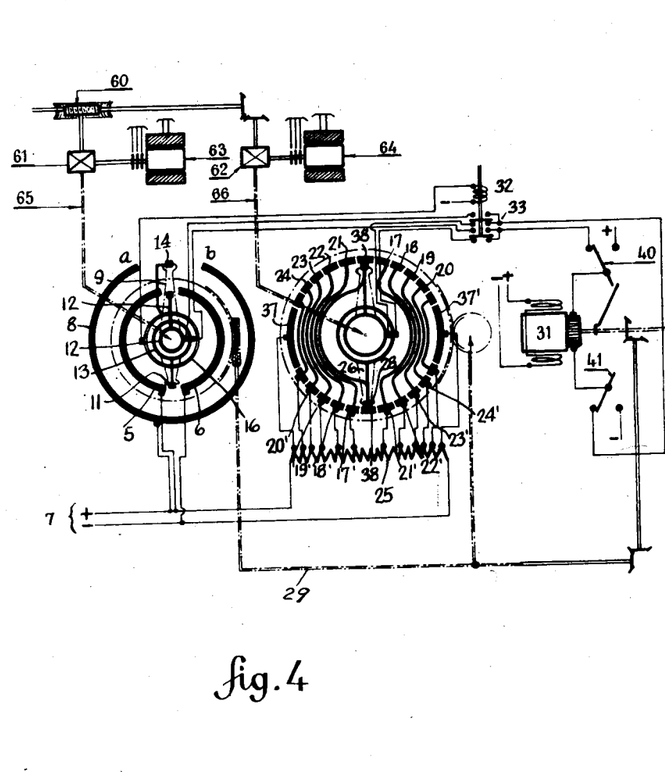
Fig. 4 is a modification of Fig. 1 wherein the concordance restoring means include simple receivers while the auxiliary motor is provided with stops limiting its rotary movement and consequently that of the rheostat arm.

In Fig. 4, applicable to the case where the displacement of the piece of ordnance is smaller than 180°, the movement of one of the two parts, piece of ordnance or telescope, is transmitted mechanically through the gears 60 to the differentials 61 (for the rough operating circuit) and 62 (for the accuracy circuit).

On the other hand the receivers 63 and 64 acting respectively on the differentials 61 and 62 receive electrically from a distance the angular motion of the second part, ordnance or telescope.

The angular shifting between the position required and the real position is thus made apparent on the shafts 65 and 66 controlled by the differentials 61—62 and which control respectively the movable contact pieces of the rough operating and of the accuracy distributors. The operation of the system is the same as in the case of Fig. 1 where the differentials 61—62 are constituted by differential receivers. The reference numbers for the distributors and their constitutive parts are the same as in Fig. 1 so that no further explanation seems necessary.

Fig. 4 comprises also a modification in the control of the arm 10 through the auxiliary motor 31. This modification consists, as already stated, in the replacement of the friction clutch 36 of the preceding figures by a system of stops 40 and 41 operating at the end of the allowed path.

Figure 5:
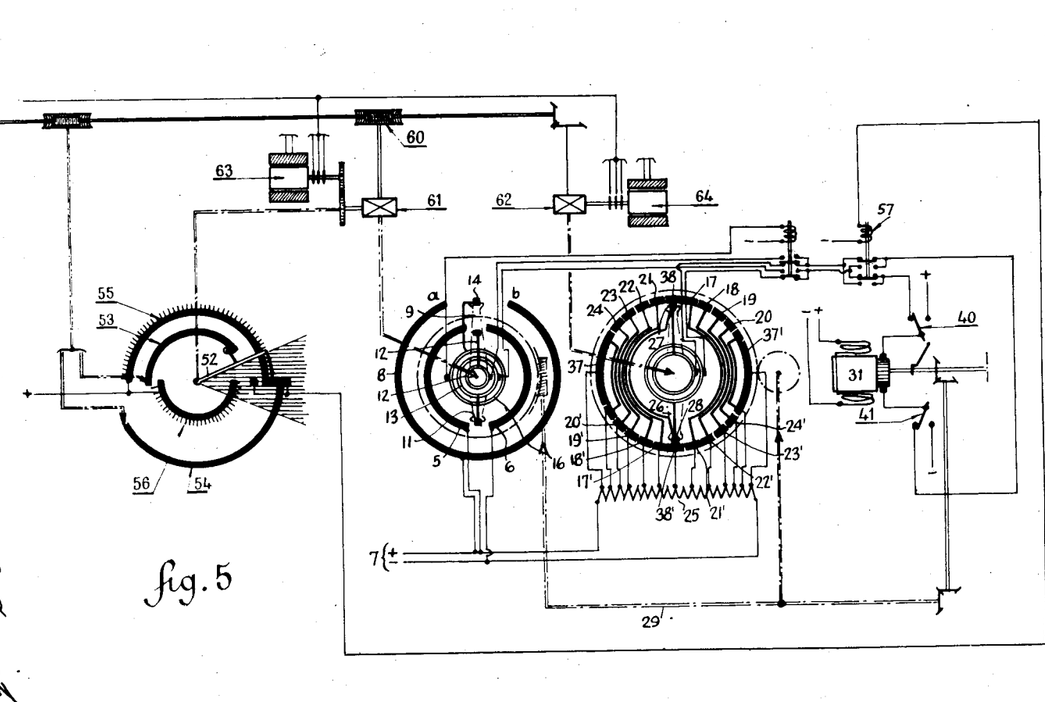
Fig. 5 is a modification of Fig. 4 wherein the ordnance moves through an angle above 180°.

Fig. 5 is a modification of Fig. 4 applied to the case where the ordnance may move inside an angle above 180° and incorporating again the reversing device of Fig. 3. The operation is exactly the same as in Fig. 3 except as concerns the comparison between the required and real positions which is effected through mechanical differentials 61—62 as in the case of Fig. 4.

Figure 6:
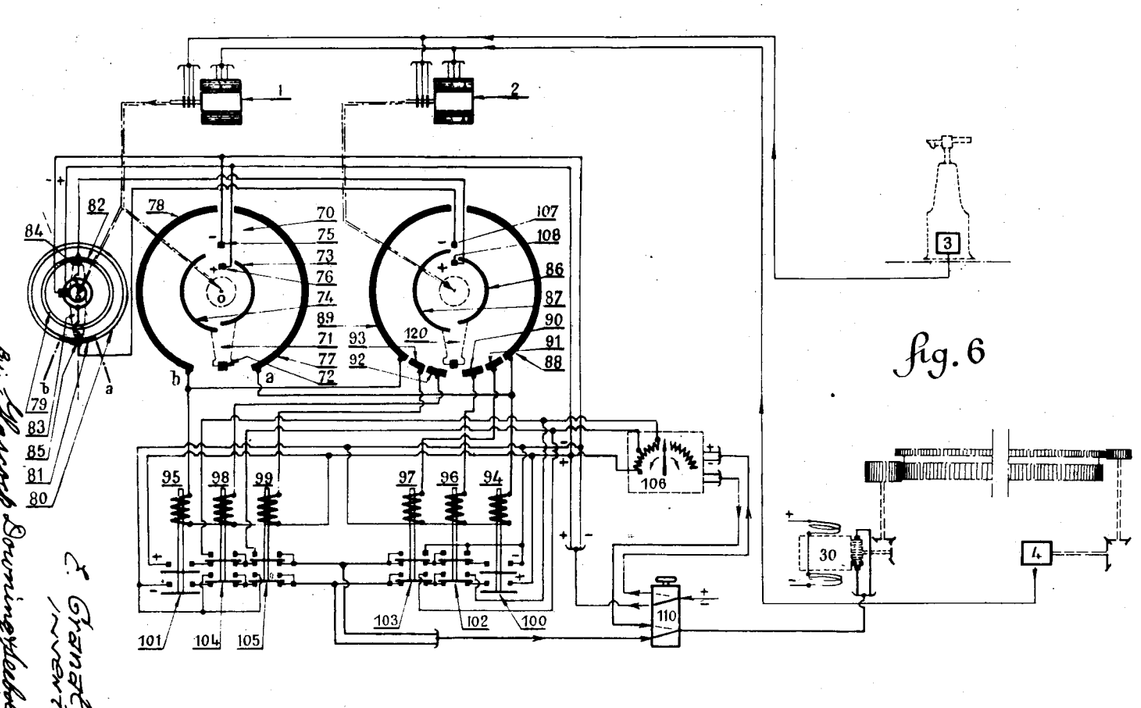
Fig. 6 is a form of execution of the concordance restoring means wherein the auxiliary motor is done away with, the concordance restoring means acting directly on resistances in order to adjust the speed of the motor actuating the ordnance.

The arrangement of Fig. 6 is a form of execution of the concordance restoring system wherein the auxiliary motor of the preceding figures is omitted.

In this arrangement the concordance restoring means act directly on the resistances in the circuit of the motor 30. In other words, the contact pieces of the rough operating and accuracy distributors play the part of the rheostat cooperating with the arm 10 of the preceding figures. If, as is the case in general, the resistances control a machine of comparatively high power, it is not possible to act directly on these resistances through the contact pieces of the distributors; there are then used suitable relays which put into circuit and out of circuit, according to the case, the adjusting resistances.

The rough operating distributor 70 is constituted in a manner similar to that illustrated in Fig. 1. The differential rough operating receiver 1 controls the arm 71 carrying the contact piece 72 and the segments 73 and 74 passing in front of the stationary contacts 75 and 76. The contact piece 72 on the arm 71 moves also in front of the stationary segments 77 and 78 which define the neutral angle aob similar to that of Fig. 1. The receiver 1 controls moreover an arm 83 carrying two contact pieces 84 and 85 moving respectively over stationary rings 81 and 82 provided with insulating parts 79 and 80.

The accuracy distributor comprises the movable arm 120 with the segments 86 and 87 similar to the segments 73 and 74 as well as the stationary segments 88 and 89 similar to the segments 77 and 78. These latter segments 88 and 89 are completed by stationary contact pieces 90, 91, etc., 92, 93, etc.

The segments 88 and 89 are adapted as well as the segments 77 and 78 to feed the relays 94 and 95. Similarly, the contact pieces 90, 91, 92, 93 feed respectively the relays 96, 97, 98 and 99. The series of relays 94 to 99 acts on a series of contacts 100 to 105 which in succession insert in and cut out of the feed circuits of the motor 30, the adjusting resistances 103.

The operation of the device is as follows:

When the shifting between the telescope and the ordnance is important, the movement of the differential receiver 1 brings the arm 83 into a position corresponding to the insulating portion of the segments 79 and 80. The contact pieces 107 and 108 are no longer fed and the rough-operating distributor operates alone in the following manner:

According to the direction of shifting, the arm 71 brings on one hand the rings 73 or 74 into contact with the respective contact piece 75 or 76 connected with the poles of the feeding source and on the other hand the contact piece 72 with one of the segments 77 or 78 according to the direction of shifting. Consequently one of the relays, 94 or 95, is fed and contact 100 or 101 allows direct feed from the terminals to the motor 30 with the short circuiting of the adjusting resistances 106: this causes the starting of the motor 30 at maximum speed in a given direction.

When the arm 71 has returned inside the angle *aob*, the arm 83 feeds the segments 81 and 82, which puts the contact pieces 107 and 108 under tension. Thus the rough-operating distributor ceases being operative while the accuracy distributor acts alone.

Provision is made for the arm 120 to have at this moment only a fraction of a revolution to pass through which is smaller than one half revolution, in order to return to its position of equilibrium which is that of the figure.

By reason of the electrical connections provided, the relay 94 or 95 continues being fed, i. e., there is no interruption in the direct feeding of the motor 30.

Gradually as the arm 120 comes nearer its position of equilibrium, it passes in succession over the contact pieces 93, 92, etc., or 91, 90, etc., these contact pieces feeding the relays 99, 98, etc., or 97, 96, etc. Consequently the contact 100 or 101 opens while the contacts 105, 104, etc., or 103, 102; . . . close in succession circuits from the plus terminal, one end of the resistance 106, a tapping on said resistance, one of the leads to the motor 30, a return lead and the minus terminal. The speed of the motor 30 is thus reduced progressively until the arm 120 arrives into its position of equilibrium. The operation would be similar in the speed increasing direction.

Fig. 6 shows also means for hand control through actuation of the switch 110 which provides a direct electric connection between a hand operated rheostat and the motor 30.

Of course the diagram would remain the same in the case of a booster or a Ward-Leonard group inserted in the circuit controlling the motor 30.

All the transmissions between the controlling part 3 and the receivers, as described hereinabove, may be constituted by these used for position indicators of small power. In the case of application to the control of pieces of ordnance and torpedo firing, the simple receivers such as 63, 64 may be formed by receivers fed directly through the extant distant levelling mains.

Moreover, the possibility afforded either of carrying the plant on the movable ordnance or the like part or of arranging it at a stationary point allows the adaptation to almost all requirements met in practice.

What I claim is:

1. An electric distant control system comprising a distant control part, a controlled part, a motor driving the latter, a rheostat therefor, first transmitting means controlled by the control part, second transmitting means controlled by the controlled part, a series of receivers submitted to the differential action of said first and second transmitting means, distributors for fine and coarse operation controlled by the corresponding receivers and controlling the rheostat in succession and means entirely located in the immediate vicinity of the distributor whereby the distributor returns the rheostat to inoperativeness when it returns itself to inoperativeness.

2. An electric distant control system comprising a distant control part, a controlled part, a motor driving the latter, a rheostat therefor, first transmitting means controlled by the control part, second transmitting means controlled by the controlled part, a series of polyphase receivers submitted to the differential action of said first and second transmitting means, distributors for fine and coarse operation controlled by the corresponding receivers, an auxiliary motor the starting, speed and stopping of which are controlled by the distributors in succession and controlling the rheostat arm and means controlled by the rheostat, entirely located in the immediate vicinity of the distributor for shifting the distributor whereby said distributor returns the rheostat to inoperativeness when the distributor returns itself to inoperativeness.

3. An electric distant control system comprising a distant control part, a controlled part, a motor driving the latter, a rheostat therefor, first transmitting means controlled by the control part, second transmitting means controlled by the controlled part, a series of receivers submitted to the differential action of said first and second transmitting means, distributors for fine and coarse operation controlled by the corresponding receivers, an auxiliary motor controlled by the distributors to start at high speed and to run at progressively reduced speed, means whereby the auxiliary motor controls the rheostat arm, a speed reducing gear connecting the rheostat arm with at least the finer distributors to angularly shift same and reverse the direction of rotation of the auxiliary motor during operation whereby the rheostat returns to inoperative position while the distributors return to their normal inoperative position.

4. In a system as claimed in claim 1, a second hand operated rheostat and a switch adapted to insert it in cooperationship with the motor driving the controlled part in lieu of the first rheostat.

5. In a system as claimed in claim 1, two further receivers in parallel with either components of the abovementioned polyphase receivers, two cooperating elements driven by said further receivers to move in angular synchronism with the the controlled and control part respectively, a relay for reversing the direction of operation of the rheostat and means whereby the relative position of the said cooperating elements with reference to a predetermined angular zone of their movements controls said reversing relay.

6. An electric distant control system comprising a distant control part, a controlled part, a motor driving the latter, a rheostat therefor, first transmitting means controlled by the control part, second transmitting means controlled by the controlled part, a series of polyphase receivers submitted to the differential action of said first and second transmitting means, distributors for fine and coarse operation controlled by the corresponding receivers, an auxiliary motor the starting, speed and stopping of which are controlled by the distributors in succession and controlling the rheostat arm and means controlled by the rheostat, entirely located in the immediate vicinity of the distributor, for shifting the distributor whereby said distributor returns the rheostat to inoperativeness when the distributor returns itself to inoperativeness and means adapted to prevent further drive of the rheostat when latter is in an extreme operative position.

7. An electric distant control system comprising a distant control part, a controlled part, a motor driving the latter, a rheostat therefor, double means controlled synchronously respectively by the controlled and control part, a distributor controlled differentially by said double means and controlling the rheostat and means entirely located in the immediate vicinity of the distributor whereby said rheostat is returned to inoperativeness when the distributor returns itself to inoperativeness, two cooperating elements driven synchronously with the abovementioned double means to move in angular synchronism with the controlled and control part respectively, a relay for reversing the direction of operation of the rheostat and means whereby the relative position of the said cooperating elements with reference to a predetermined angular zone of their movements controls said reversing relay.

8. An electric distant control system comprising a distant control part, a controlled part, a motor driving the latter, a speed controlling device for said motor, first means adapted to rotate in unison with the control part, second means adapted to rotate in unison with the controlled part, a distributor controlled differentially by both lastmentioned means, an auxiliary motor controlled by the distributor and mechanically controlling the speed controlling means and means mechanically controlled by said speed controlling means for shifting the distributor to reverse the direction of rotation of the auxiliary motor while the distributor is returning to its inoperative position.

ELIE GRANAT.